(12) United States Patent
Ozai et al.

(10) Patent No.: US 7,737,212 B2
(45) Date of Patent: Jun. 15, 2010

(54) HEAT CONDUCTIVE SILICONE COMPOSITION

(75) Inventors: Toshiyuki Ozai, Takasaki (JP); Naoki Yamakawa, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 752 days.

(21) Appl. No.: 11/439,277

(22) Filed: May 24, 2006

(65) Prior Publication Data

US 2006/0270788 A1 Nov. 30, 2006

(30) Foreign Application Priority Data

May 25, 2005 (JP) ............................. 2005-151799

(51) Int. Cl.
  *C08L 83/04* (2006.01)
(52) U.S. Cl. ....................... 524/588; 524/437; 525/477; 525/478; 525/479; 528/15; 528/24; 528/31; 528/32
(58) Field of Classification Search ................. 524/588, 524/80, 779, 786; 528/15, 31–33; 556/400
See application file for complete search history.

(56) References Cited

U.S. PATENT DOCUMENTS

| | | | |
|---|---|---|---|
| 4,898,910 A * | 2/1990 | Kamis et al. ................. | 524/860 |
| 6,306,957 B1 | 10/2001 | Nakano et al. | |
| 6,380,301 B1 | 4/2002 | Enami et al. | |
| 6,844,393 B2 * | 1/2005 | Goto et al. ................... | 524/588 |

FOREIGN PATENT DOCUMENTS

| | | |
|---|---|---|
| EP | 0 757 080 A2 | 2/1997 |
| EP | 1 331 248 A2 | 7/2003 |
| JP | 02-041362 | 2/1990 |
| JP | 2000-256558 | 9/2000 |
| JP | 2001-139815 | 5/2001 |
| JP | 2003-213133 | 7/2003 |
| JP | 2004-352947 | 12/2004 |
| WO | 02/092693 | 11/2002 |

OTHER PUBLICATIONS

U.S. Appl. No. 11/859,123, filed Sep. 21, 2007, Ozai.

* cited by examiner

*Primary Examiner*—Marc S Zimmer
(74) *Attorney, Agent, or Firm*—Oblon, Spivak, McClelland, Maier & Neustadt, L.L.P.

(57) ABSTRACT

A heat conductive silicone composition is provided, which includes (A) an organopolysiloxane having the formula (1):

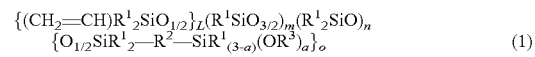

wherein $R^1$ represents monovalent hydrocarbon groups, $R^2$ represents an oxygen atom or a bivalent hydrocarbon group, $R^3$ represents an alkyl group, alkoxyalkyl group, alkenyl group, or acyl group, L and o represent numbers from 1 to 10, m represents a number from 0 to 10, n represents a number from 5 to 100, a represents an integer from 1 to 3, and when m=0, L+o=2 and $R^2$ is a bivalent hydrocarbon group, (B) a heat conductive filler, and (C) an organopolysiloxane other than the component (A). Even upon high-level packing with the heat conductive filler to obtain a highly heat conductivity, the composition still exhibits favorable handling and moldability properties.

33 Claims, No Drawings

HEAT CONDUCTIVE SILICONE COMPOSITION

BACKGROUND OF THE INVENTION

1. Field of the Invention

The present invention relates to a heat conductive silicone composition which, even upon high-level packing with a heat conductive filler in order to achieve a silicone composition that is highly heat conductive, still exhibits favorable handling and moldability properties, and also exhibits favorable physical properties following curing.

2. Description of the Prior Art

As printed circuit boards and hybrid ICs with mounted electronic components such as transistors, ICs, and memory modules and the like have trended towards higher levels of packaging density and higher levels of integration, heat conductive silicone compositions such as heat conductive silicone greases, heat conductive silicone gel compositions, and heat conductive silicone rubber compositions have been increasingly used to ensure effective heat radiation from these devices.

In order to improve the thermal conductivity of these types of heat conductive silicone compositions by high-level packing of the composition with a heat conductive filler, heat conductive silicone rubber compositions comprising an organopolysiloxane, a hydrolysable group-containing methylpolysiloxane, a heat conductive filler, and a curing agent (patent reference 1), and heat conductive silicone rubber compositions comprising a curable organopolysiloxane, a curing agent, and a heat conductive filler, wherein the surface of the filler has been treated with an oligosiloxane containing silicon atom-bonded alkoxy groups (patent reference 2) have already been proposed.

However, if an attempt is made to further improve the thermal conductivity of these types of heat conductive silicone compositions by the high-level packing of a heat conductive filler such as alumina or the like, then a problem arises in that the physical properties of the compositions deteriorate significantly following curing.

[Patent Reference 1] U.S. Pat. No. 6,306,957
[Patent Reference 2] U.S. Pat. No. 6,380,301

SUMMARY OF THE INVENTION

An object of the present invention is to provide a heat conductive silicone composition which, even upon high-level packing with a heat conductive filler in order to obtain a silicone composition that is highly heat conductive, still exhibits favorable handling and moldability properties, and also exhibits favorable physical properties following curing.

As a result of intensive investigation aimed at achieving the above object, the inventors of the present invention arrived at the present invention. In other words, the present invention provides, as a composition for achieving the above object, a heat conductive silicone composition, comprising (A) an organopolysiloxane represented by a general formula (1) shown below:

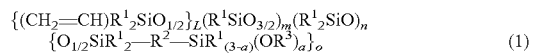

(1)

(wherein, $R^1$ represents identical or different monovalent hydrocarbon groups, $R^2$ represents an oxygen atom or a bivalent hydrocarbon group, $R^3$ represents an alkyl group, alkoxyalkyl group, alkenyl group, or acyl group, L and o represent positive numbers from 1 to 10, m represents a number from 0 to 10, n represents a positive number from 5 to 100, a represents an integer from 1 to 3, and when m=0, L+o=2 and $R^2$ is a bivalent hydrocarbon group), (B) a heat conductive filler, and
(C) an organopolysiloxane other than the component (A).

A heat conductive silicone composition of the present invention exhibits favorable handling and moldability properties, even upon high-level packing with a heat conductive filler in order to obtain a silicone composition that is highly heat conductive, and the cured product of the composition exhibits favorable physical properties such as hardness, elongation, tensile strength, and adhesive strength.

DETAILED DESCRIPTION OF THE PREFERRED EMBODIMENTS

As follows is a more detailed description of the present invention.

A composition of the present invention is a heat conductive silicone composition that comprises an aforementioned organopolysiloxane of the component (A), a heat conductive filler of the component (B), and an organopolysiloxane of the component (C). There are no particular restrictions on the state of the composition of the present invention, and at room temperature, the composition may exist as a grease, slurry, paste, or clay-like state. The composition of the present invention may be either non-curable, or may be converted to a curable form by also including a curing agent of the component (D). In those cases where the composition of the present invention is curable, the heat conductive silicone composition may form either a gel-like cured product on curing (namely, a heat conductive silicone gel), or a rubber-like cured product (namely, a heat conductive silicone rubber). If the composition of the present invention exhibits curability, then there are no particular restrictions on the mechanism for that curing, and suitable mechanisms include a hydrosilylation reaction, a condensation reaction, or a free radical reaction that uses an organic peroxide, although of these, a hydrosilylation reaction is preferred, as it yields rapid curing of the composition and generates no by-products.

[Component (A)]

The component (A) imparts favorable moldability to the composition of the present invention with no deterioration in the handling properties, even when the silicone composition of the present invention is highly packed with a heat conductive filler of the component (B) in order to obtain a silicone composition that is highly heat conductive. The component (A) treats the surface of the component (B), improving the dispersibility of the component (B) within the heat conductive silicone composition of the present invention.

The component (A) is an organopolysiloxane represented by a general formula (1) shown below:

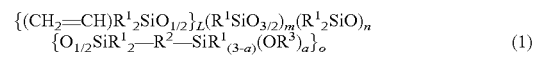

(1)

(wherein, $R^1$ represents identical or different monovalent hydrocarbon groups, $R^2$ represents an oxygen atom or a bivalent hydrocarbon group, $R^3$ represents an alkyl group, alkoxyalkyl group, alkenyl group, or acyl group, L and o represent positive numbers from 1 to 10, m represents a number from 0 to 10, n represents a positive number from 5 to 100, a represents an integer from 1 to 3, and when m=0, L+o=2 and $R^2$ is a bivalent hydrocarbon group).

In the above general formula (1), $R^1$ represents identical or different monovalent hydrocarbon groups, and suitable examples include straight-chain alkyl groups such as a methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, or eicosyl group; branched-chain alkyl groups such as an isopropyl group, t-butyl group, isobutyl group, 2-methylundecyl group, or 1-hexylheptyl group; cyclic alkyl groups such as a cyclopentyl group, cyclohexyl group, or cyclododecyl group; alkenyl groups such as a vinyl group, allyl group, butenyl group, pentenyl group, or hexenyl group; aryl groups such as a phenyl group, tolyl group, or xylyl group; aralkyl groups such as a benzyl group, phenethyl group, or 2-(2,4,6-trimethylphenyl)propyl group, and halogenated alkyl groups such as a 3,3,3-trifluoropropyl group or 3-chloropropyl group, and of these, straight-chain alkyl groups, alkenyl groups, and aryl groups are preferred, and a methyl group, phenyl group, or vinyl group is particularly desirable.

In the above general formula (1), $R^2$ represents either an oxygen atom or a bivalent hydrocarbon group. Suitable examples in those cases where $R^2$ represents a bivalent hydrocarbon group include an ethylene group, propylene group, butylene group, or methylethylene group, and of these, an ethylene group or propylene group is preferred.

In the above general formula (1), $R^3$ represents an alkyl group, alkoxyalkyl group, alkenyl group, or acyl group. In those cases where $R^3$ is an alkyl group, suitable examples include the same straight-chain alkyl groups, branched-chain alkyl groups, and cyclic alkyl groups as those listed above in relation to $R^1$. In those cases where $R^3$ is an alkoxyalkyl group, suitable examples include a methoxyethyl group or methoxypropyl group. In those cases where $R^3$ is an alkenyl group, suitable examples include the same alkenyl groups as those listed above in relation to $R^1$. In those cases where $R^3$ is an acyl group, suitable examples include an acetyl group or octanoyl group. $R^3$ is preferably a straight-chain alkyl group, and even more preferably a methyl group or ethyl group.

In the above general formula (1), L and o represent positive numbers from 1 to 10. m represents a number from 0 to 10, and preferably a positive number from 1 to 10. n represents a positive number from 5 to 100. a represents an integer from 1 to 3, and is preferably 3. However, when m=0, L+o=2 and $R^2$ is a bivalent hydrocarbon group. L, m, n, and o are integers that fall within the above ranges for each individual molecule, but in the case of a uniform component comprising a mixture of two or more different molecules, L, m, n, and o are numbers (0 or positive numbers) within the above range that represent average values.

Specific examples of the component (A) include the organopolysiloxanes represented by the formulas shown below:

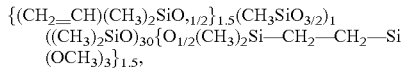

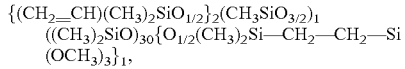

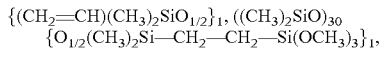

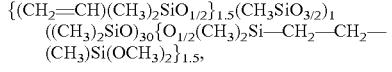

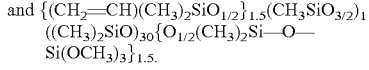

There are no particular restrictions on the quantity of the component (A) within the composition of the present invention, and any quantity that is capable of treating the surface of the component (B) and improving the dispersibility of the component (B) within the heat conductive silicone composition of the present invention is suitable. Specifically, the quantity is preferably within a range from 0.1 to 10 parts by mass per 100 parts by mass of the component (B), and quantities from 0.1 to 5 parts by mass are particularly desirable. If the quantity of the component (A) falls within this range, then the physical properties of the composition of the present invention are less likely to deteriorate, and even if a large quantity of the component (B) is included, the moldability of the composition of the present invention can still be readily maintained, and the component (B) is less likely to undergo separation by precipitation during storage of the composition.

The component (A) may be used either alone, or in combinations of two or more different compounds.

[Component (B)]

The component (B) is a heat conductive filler for imparting thermal conductivity to the composition of the present invention. Examples of this component include metal-based powders such as aluminum powder, copper powder, and nickel powder; metal oxide-based powders such as alumina powder, magnesium oxide powder, beryllium oxide powder, chromium oxide powder, and titanium oxide powder; metal nitride-based powders such as boron nitride powder and aluminum nitride powder; metal carbide-based powders such as boron carbide powder, titanium carbide powder, and silicon carbide powder; and mixtures of two or more of the above powders. In those cases where either the composition of the present invention, or the silicone cured product obtained by curing the composition of the present invention, requires electrical insulating properties, the component (B) is preferably a metal oxide-based powder, metal nitride-based powder, or metal carbide-based powder, and alumina powder is particularly desirable.

Furthermore, suitable shapes for the component (B) include spherical, rod-like, needle-like, disc-like, and amorphous shapes. In this description, the term "spherical" refers to a shape in which the entire surface is formed from a convex smooth surface. Accordingly, in those cases where the shape of the component (B) is spherical, neither ridges nor edges exist at the intersection between adjoining surfaces, and the value of the ratio (length of longest axis)/(length of shortest axis) (the aspect ratio) is typically within a range from 1 to 2, and preferably from 1 to 1.6, and even more preferably from 1 to 1.4. The term "rod-like" refers to a shape which is elongated along one axial direction, and in which the thickness is substantially constant along the longest axis. The term "needle-like", is similar to "rod-like" in that the shape is elongated along one axial direction, but the shape also includes portions in which the thickness narrows towards the ends of the shape in the direction of the longest axis, whereas within the remaining portions, the thickness is substantially constant along the longest axis, meaning the end portions are pointed. The term "disc-like" refers to a flat shape which has a thickness in addition to a length for the longest axis and a length for the shortest axis. The term "amorphous" refers to shapes which cannot be classified as a specific shape.

Although there are no particular restrictions on the average particle diameter of the component (B), the value is preferably within a range from 0.1 to 100 μm, and even more preferably from 0.1 to 50 μm. If the average particle diameter falls within this range, then the composition of the present invention is more likely to exhibit a favorable balance between flowability and thermal conductivity. In this description, the term "average particle diameter" refers to the average value $D_{50}$ of the cumulative weight (or the median diameter) determined by a particle size distribution analyzer using a laser diffraction method.

In those cases where alumina powder is used as the heat conductive filler of the component (B), the use of a mixture containing ($B_1$) a spherical alumina powder with an average particle diameter exceeding 5 µm but no greater than 50 µm, and ($B_2$) a spherical or amorphous alumina powder with an average particle diameter of at least 0.1 µm but no greater than 5 µm as the component (B) is preferred in terms of the packing efficiency relative to the silicone.

Although there are no particular restrictions on the quantity of the component (B) within the composition of the present invention, in order to ensure formation of a silicone composition with a favorable thermal conductivity, the quantity of the component (B), expressed as a % by volume, is preferably at least 30% by volume, even more preferably within a range from 30 to 90% by volume, even preferably from 60 to 90% by volume, and most preferably from 80 to 90% by volume, of the composition of the present invention. Similarly, in order to ensure formation of a silicone composition with a favorable thermal conductivity, the quantity of the component (B), expressed as a % by mass, is preferably at least 50% by mass, even more preferably within a range from 70 to 98% by mass, and most preferably from 90 to 97% by mass, of the composition of the present invention. Specifically, the quantity of the component (B), relative to 100 parts by mass of the component (C), is preferably within a range from 500 to 2,500 parts by mass, even more preferably from 500 to 2,000 parts by mass, and most preferably from 800 to 2,000 parts by mass. Provided the quantity of the component (B) falls within this range, the thermal conductivity of the composition of the present invention is more likely to reach a satisfactory level, and the viscosity of the composition of the present invention can be more easily prevented from becoming excessively high, meaning the component (B) can be more readily dispersed in a uniform manner within the composition of the present invention, and also ensuring that the composition of the present invention exhibits more favorable handling and workability.

The component (B) may be used either alone, or in combinations of two or more different materials.

[Component (C)]

The component (C) is the base polymer for the composition of the present invention, and is an organopolysiloxane that is different from the aforementioned component (A).

Examples of the groups bonded to silicon atoms within the component (C) include the same straight-chain alkyl groups, branched-chain alkyl groups, cyclic alkyl groups, alkenyl groups, aryl groups, aralkyl groups, and halogenated alkyl groups as those listed above in relation to the group $R^1$ of the general formula (1), although straight-chain alkyl groups, alkenyl groups, and aryl groups are preferred, and methyl groups, vinyl groups, and phenyl groups are particularly desirable.

Although there are no particular restrictions on the viscosity at 25° C. of the component (C), the viscosity is preferably within a range from 20 to 100,000 mPa·s, even more preferably from 50 to 100,000 mPa·s, even more preferably from 50 to 50,000 mPa·s, and most preferably from 100 to 50,000 mPa·s. If the viscosity falls within this range, then the handling and workability of the composition of the present invention are more readily maintained, and the favorable physical properties of the cured product of the composition of the present invention are also more readily maintained.

There are no particular restrictions on the molecular structure of the component (C), and suitable structures include straight-chain structures, branched-chain structures, straight-chain structures with partial branching, and dendrimer structures, although straight-chain structures and straight-chain structures with partial branching are preferred. The component (C) may be a single polymer with one of the above molecular structures, a copolymer with one of the above molecular structures, or a mixture of such polymers.

Examples of the component (C) include dimethylpolysiloxane with both molecular chain terminals blocked with dimethylvinylsiloxy groups, dimethylpolysiloxane with both molecular chain terminals blocked with methylphenylvinylsiloxy groups, copolymers of dimethylsiloxane and methylphenylsiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane and methylvinylsiloxane with both molecular chain terminals blocked with trimethylsiloxy groups, methyl(3,3,3-trifluoropropyl)polysiloxane with both molecular chain terminals blocked with dimethylvinylsiloxy groups, copolymers of dimethylsiloxane and methylvinylsiloxane with both molecular chain terminals blocked with silanol groups, copolymers of dimethylsiloxane, methylvinylsiloxane, and methylphenylsiloxane with both molecular chain terminals blocked with silanol groups, organopolysiloxane copolymers comprising siloxane units represented by a formula $(CH_3)_3SiO_{1/2}$, siloxane units represented by a formula $(CH_3)_2(CH_2=CH)SiO_{1/2}$, siloxane units represented by a formula $CH_3SiO_{3/2}$, and siloxane units represented by a formula $(CH_3)_2SiO_{2/2}$, dimethylpolysiloxane with both molecular chain terminals blocked with silanol groups, copolymers of dimethylsiloxane and methylphenylsiloxane with both molecular chain terminals blocked with silanol groups, dimethylpolysiloxane with both molecular chain terminals blocked with trimethoxysiloxy groups, copolymers of dimethylsiloxane and methylphenylsiloxane with both molecular chain terminals blocked trimethoxysiloxy groups, dimethylpolysiloxane with both molecular chain terminals blocked with methyldimethoxysiloxy groups, dimethylpolysiloxane with both molecular chain terminals blocked with triethoxysiloxy groups, dimethylpolysiloxane with both molecular chain terminals blocked with trimethoxysilylethyl groups, and mixtures of two or more of the above polymers.

The component (C) may be used either alone, or in combinations of two or more different materials.

Cases Where the Composition of the Present Invention Cures Via a Hydrosilylation Reaction In these cases, the component (C) is preferably an organopolysiloxane containing an average of at least 0.1 silicon atom-bonded alkenyl groups within each molecule, is even more preferably an organopolysiloxane containing an average of at least 0.5 silicon atom-bonded alkenyl groups within each molecule, and is most preferably an organopolysiloxane containing an average of at least 0.8 silicon atom-bonded alkenyl groups within each molecule. Provided the average number of alkenyl groups present within each molecule falls within the above range, the composition of the present invention can be readily cured.

Examples of the alkenyl group include the same alkenyl groups as those listed above in relation to $R^1$, and a vinyl group is preferred. Furthermore, examples of groups other than alkenyl groups bonded to silicon atoms within this organopolysiloxane include the same straight-chain alkyl groups, branched-chain alkyl groups, cyclic alkyl groups, aryl groups, aralkyl groups, and halogenated alkyl groups as those listed above in relation to $R^1$, and of these, straight-chain alkyl groups and aryl groups are preferred, and methyl groups and phenyl groups are particularly desirable.

Although there are no particular restrictions on the viscosity at 25° C. of this organopolysiloxane, the viscosity is preferably within a range from 20 to 100,000 mPa·s, even more preferably from 50 to 100,000 mPa·s, even more preferably from 50 to 50,000 mPa·s, and most preferably from 100 to 50,000 mPa·s. If the viscosity falls within this range, then the handling and workability of the composition of the present invention are more readily maintained, and the favorable physical properties of the cured product of the composition of the present invention are also more readily maintained.

There are no particular restrictions on the molecular structure of this organopolysiloxane, and suitable structures include the same structures as those listed above for the general component (C), although straight-chain structures and straight-chain structures with partial branching are preferred. This organopolysiloxane may be a single polymer with one of the above molecular structures, a copolymer with one of the above molecular structures, or a mixture of such polymers. The above alkenyl groups may exist at either the molecular chain terminals or at non-terminal positions within the molecular chain, or may also exist at both positions. Examples of this organopolysiloxane include those organopolysiloxanes amongst those listed above in relation to the general component (C) that contain alkenyl groups.

Cases Where the Composition of the Present Invention Cures Via a Condensation Reaction In these cases, the component (C) is preferably an organopolysiloxane containing at least 2 silanol groups or silicon atom-bonded hydrolysable groups within each molecule.

Examples of suitable hydrolysable groups include alkoxy groups such as a methoxy group, ethoxy group, or propoxy group; alkenoxy groups such as a vinyloxy group, propenoxy group, isopropenoxy group, or 1-ethyl-2-methylvinyloxy group; alkoxyalkoxy groups such as a methoxyethoxy group, ethoxyethoxy group, or methoxypropoxy group; acyloxy groups such as an acetoxy group or octanoyloxy group; ketoxime groups such as a dimethyl ketoxime group or methyl ethyl ketoxime group; amino groups such as a dimethylamino group, diethylamino group, or butylamino group; aminoxy groups such as a dimethylaminoxy group or diethylaminoxy group; and amide groups such as an N-methylacetamide group or N-ethylacetamide group.

Examples of the groups bonded to silicon atoms within this organopolysiloxane other than the silanol groups or silicon atom-bonded hydrolysable groups include the same straight-chain alkyl groups, branched-chain alkyl groups, cyclic alkyl groups, alkenyl groups, aryl groups, aralkyl groups, and halogenated alkyl groups as those listed above in relation to $R^1$.

Although there are no particular restrictions on the viscosity at 25° C. of this organopolysiloxane, the viscosity is preferably within a range from 20 to 100,000 mPa·s, even more preferably from 50 to 100,000 mPa·s, and most preferably from 100 to 100,000 mPa·s. If the viscosity falls within this range, then the handling and workability of the composition of the present invention are more readily maintained, and the favorable physical properties of the cured product of the composition of the present invention are also more readily maintained.

There are no particular restrictions on the molecular structure of this organopolysiloxane, and suitable structures include the same structures as those listed above for the general component (C), although straight-chain structures and straight-chain structures with partial branching are preferred. This organopolysiloxane may be a single polymer with one of the above molecular structures, a copolymer with one of the above molecular structures, or a mixture of such polymers. Examples of this organopolysiloxane include those organopolysiloxanes amongst those listed above in relation to the general component (C) that contain at least 2 silanol groups or silicon atom-bonded hydrolysable groups within each molecule.

Cases Where the Composition of the Present Invention Cures Via a Free Radical Reaction Using an Organic Peroxide In these cases, there are no particular restrictions on the organopolysiloxane of the component (C), although organopolysiloxanes containing at least 1 silicon atom-bonded alkenyl group within each molecule are preferred.

Examples of the groups bonded to silicon atoms within this organopolysiloxane include the same straight-chain alkyl groups, branched-chain alkyl groups, cyclic alkyl groups, alkenyl groups, aryl groups, aralkyl groups, and halogenated alkyl groups as those listed above in relation to $R^1$, and of these, straight-chain alkyl groups, alkenyl groups, and aryl groups are preferred, and methyl groups, vinyl groups, and phenyl groups are particularly desirable.

Although there are no particular restrictions on the viscosity at 25° C. of this organopolysiloxane, the viscosity is preferably within a range from 20 to 100,000 mPa·s, even more preferably from 50 to 100,000 mPa·s, even more preferably from 50 to 50,000 mPa·s, and most preferably from 100 to 50,000 mPa·s. If the viscosity falls within this range, then the handling and workability of the composition of the present invention are more readily maintained, and the favorable physical properties of the cured product of the composition of the present invention are also more readily maintained.

There are no particular restrictions on the molecular structure of this organopolysiloxane, and suitable structures include the same structures as those listed above for the general component (C), although straight-chain structures and straight-chain structures with partial branching are preferred. This organopolysiloxane may be a single polymer with one of the above molecular structures, a copolymer with one of the above molecular structures, or a mixture of such polymers. Examples of this organopolysiloxane include the same organopolysiloxanes as those listed above in relation to the general component (C).

[Component (D)]

The component (D) is a curing agent. By including the component (D), the composition of the present invention can be converted to a curable composition. The component (D) may be used either alone, or in combinations of two or more different compounds.

Cases Where the Composition of the Present Invention Cures Via a Hydrosilylation Reaction In these cases, the curing agent of the component (D) comprises an organopolysiloxane containing an average of at least 2 silicon atom-bonded hydrogen atoms within each molecule, and a platinum-based catalyst.

Examples of the groups bonded to silicon atoms within this organopolysiloxane other than the hydrogen atoms include the same straight-chain alkyl groups, branched-chain alkyl groups, cyclic alkyl groups, aryl groups, aralkyl groups, and halogenated alkyl groups as those listed above in relation to $R^1$, and of these, straight-chain alkyl groups and aryl groups are preferred, and methyl groups and phenyl groups are particularly desirable.

Although there are no particular restrictions on the viscosity at 25° C. of this organopolysiloxane, the viscosity is preferably within a range from 1 to 100,000 mPa·s, and even more preferably from 1 to 5,000 mPa·s. If the viscosity falls within this range, then the handling and workability of the composition of the present invention are more readily maintained, and the favorable physical properties of the cured product of the composition of the present invention are also more readily maintained.

There are no particular restrictions on the molecular structure of this organopolysiloxane, and suitable structures include straight-chain structures, branched-chain structures, straight-chain structures with partial branching, cyclic structures, and dendrimer structures. This organopolysiloxane may be a single polymer with one of the above molecular structures, a copolymer with one of the above molecular structures, or a mixture of such polymers. The silicon atom-bonded hydrogen atoms may exist only at the molecular chain terminals or only at non-terminal positions within the molecular chain, or may also exist at both positions.

Examples of this organopolysiloxane include dimethylpolysiloxane with both molecular chain terminals blocked with dimethylhydrogensiloxy groups, copolymers of dimethylsiloxane and methylhydrogensiloxane with both molecular chain terminals blocked with trimethylsiloxy groups, copolymers of dimethylsiloxane and methylhydrogensiloxane with both molecular chain terminals blocked with dimethylhydrogensiloxy groups, organopolysiloxane copolymers comprising siloxane units represented by a formula $(CH_3)_3SiO_{1/2}$, siloxane units represented by a formula $(CH_3)_2HSiO_{1/2}$, and siloxane units represented by a formula $SiO_{4/2}$, and mixtures of two or more of the above polymers.

There are no particular restrictions on the quantity of this organopolysiloxane within the composition of the present invention, and the quantity need only be sufficient to enable curing of the composition. Specifically, the quantity is preferably sufficient to provide from 0.1 to 10 mols, even more preferably from 0.1 to 5 mols, and most preferably from 0.1 to 3.0 mols, of silicon atom-bonded hydrogen atoms within this component (D) for every 1 mol of silicon atom-bonded alkenyl groups within the component (C). Provided the quantity is at this type of level, the composition of the present invention can be readily cured, while the cured product of the composition of the present invention can be prevented from becoming excessively hard, reducing the likelihood of multiple cracks appearing in the surface of the cured product.

The platinum-based catalyst is a catalyst for accelerating the curing of the composition of the present invention, and suitable examples of this catalyst include chloroplatinic acid, alcohol solutions of chloroplatinic acid, olefin complexes of platinum, alkenylsiloxane complexes of platinum, and carbonyl complexes of platinum.

The quantity of the platinum-based catalyst need only be sufficient to ensure effectiveness as a hydrosilylation reaction catalyst. Specifically, the quantity of the catalyst, expressed as a mass-referenced quantity of platinum metal within the component (D) relative to the quantity of the component (C), is preferably within a range from 0.01 to 1,000 ppm, and even more preferably from 0.1 to 500 ppm. If the quantity is at this type of level, the composition of the present invention can be readily cured, and the curing rate for the composition improves markedly with increases in the quantity of the catalyst.

Cases Where the Composition of the Present Invention Cures Via a Condensation Reaction In these cases, the component (D) comprises a silane or siloxane oligomer containing at least 3 silicon atom-bonded hydrolysable groups within each molecule, and a condensation reaction catalyst as an optional component.

Examples of the silicon atom-bonded hydrolysable groups within this silane or siloxane oligomer include the same alkoxy groups, alkenoxy groups, alkoxyalkoxy groups, acyloxy groups, ketoxime groups, amino groups, aminoxy groups, and amide groups as those listed in relation to the silicon atom-bonded hydrolysable group within the component (C) in those cases where the composition of the present invention undergoes curing via a condensation reaction. Furthermore, in addition to the hydrolysable groups described above, other groups may also be bonded to the silicon atoms of the silane or siloxane oligomer, including the same straight-chain alkyl groups, branched-chain alkyl groups, cyclic alkyl groups, alkenyl groups, aryl groups, aralkyl groups, and halogenated alkyl groups as those listed above in relation to $R^1$.

Specific examples of this silane or siloxane oligomer include, for example, tetraethoxysilane, methyltriethoxysilane, vinyltriethoxysilane, methyltris(methylethylketoxime) silane, vinyltriacetoxysilane, and ethyl orthosilicate.

There are no particular restrictions on the quantity of this silane or siloxane oligomer within the composition of the present invention, provided the composition is able to be cured. Specifically, the quantity is preferably within a range from 0.01 to 20 parts by mass, and even more preferably from 0.1 to 10 parts by mass, per 100 parts by mass of the component (C). If the quantity falls within this range, then the storage stability and adhesiveness of the composition of the present invention can be more readily maintained, and excessively slow curing of the composition can be more readily prevented.

The condensation reaction catalyst is an optional component, and is unnecessary in cases where a silane or siloxane oligomer containing aminoxy groups, amino groups, or ketoxime groups or the like as the hydrolysable groups is used as the curing agent of the component (D). Examples of this condensation reaction catalyst include organotitanate esters such as tetrabutyl titanate and tetraisopropyl titanate; organotitanium chelate compounds such as diisopropoxybis(acetylacetato)titanium and diisopropoxybis(ethylacetoacetato)titanium; organoaluminum compounds such as aluminum tris(acetylacetonate) and aluminum tris(ethylacetoacetate); organozirconium compounds such as zirconium tetra(acetylacetonate) and zirconium tetrabutyrate; organotin compounds such as dibutyltin dioctanoate, dibutyltin dilaurate and butyltin-2-ethylhexanoate; metal salts of organic carboxylic acids such as tin naphthenate, tin oleate, tin butyrate, cobalt naphthenate, and zinc stearate; amine compounds or the salts thereof such as hexylamine and dodecylamine phosphate; quaternary ammonium salts such as benzyltriethylammonium acetate; lower fatty acid salts of alkali metals such as potassium acetate, lithium acetate and sodium acetate; dialkylhydroxylamines such as dimethylhydroxylamine and diethylhydroxylamine; and guanidyl group-containing organosilicon compounds.

The quantity of this condensation reaction catalyst within the composition of the present invention need only be sufficient to ensure effectiveness as a condensation reaction catalyst. Specifically, the quantity is preferably within a range from 0.01 to 20 parts by mass, and even more preferably from 0.1 to 10 parts by mass, per 100 parts by mass of the component (C). If the quantity falls within this range, then the storage stability of the composition of the present invention can be more readily maintained, while the composition can still be readily cured.

Cases Where the Composition of the Present Invention Cures Via a Free Radical Reaction Using an Organic Peroxide In these cases, the component (D) is an organic peroxide. Suitable examples of this organic peroxide include benzoyl peroxide, di(p-methylbenzoyl) peroxide, di(o-methylbenzoyl)peroxide, dicumyl peroxide, 2,5-dimethyl-2,5-bis-(t-butylperoxy)hexane, di-t-butyl peroxide and t-butyl peroxybenzoate.

There are no particular restrictions on the quantity of this organic peroxide within the composition of the present invention, and the quantity need only be sufficient to enable curing of the composition of the present invention. Specifically, the quantity is preferably within a range from 0.1 to 5 parts by mass per 100 parts by mass of the component (C).

[Other Components]

If required, the composition of the present invention may also include other components, including fillers such as fumed silica, precipitated silica, and fumed titanium oxide, fillers in which the surface of the above fillers have been subjected to hydrophobic treatment, pigments, dyes, fluorescent dyes, heat resistant additives, flame retardants other than triazole-based compounds, plasticizers, and adhesion-imparting agents, provided the inclusion of these additives does not impair the object of the present invention.

In particular, in the case where the composition of the present invention is cured by a hydrosilylation reaction, the composition may also include a curing reaction inhibitor, including an acetylene-based compound such as 2-methyl-3-butyn-2-ol, 2-phenyl-3-butyn-2-ol, or 1-ethynyl-1-cyclohexanol; an ene-in compound such as 3-methyl-3-penten-1-in, 3,5-dimethyl-3-hexen-1-in; a hydrazine-based compound; a phosphine-based compound; or a mercaptan-based compound, in order to enable regulation of the curing rate of the composition, thereby enabling an improvement in the handling and workability properties. In those cases where the composition of the present invention comprises this type of curing reaction inhibitor, there are no particular restrictions on the quantity of the inhibitor, although a quantity within a range from 0.0001 to 1.0% by mass relative to the quantity of the composition is preferred.

[Method of Producing the Composition]

The composition of the present invention can be produced by a method in which the component (A) and the component (B) are mixed together to yield a mixture, and this mixture is then added to the component (C) (production method 1), a method in which the component (B) and the component (C) are mixed together to yield a mixture, and the component (A) is then added to this mixture (production method 2), and a method in which the components (A) through (C) are mixed together simultaneously (production method 3). The mixing can be conducted using conventional methods. In the production method 1, the surface of the component (B) is treated with the component (A) prior to addition of the mixture to the component (C), whereas in the production methods 2 and 3, the surface of the component (B) is treated with the component (A) within the component (C). In this manner, the component (A) may be incorporated into the composition of the present invention having already been used to treat the surface of the component (B), or may be included within the composition of the present invention as a lone component, but the surface treatment of the component (B) is more effective if the component (B) and the component (C) are mixed together, and consequently, in the present invention, the use of either the production method 2 or 3 is preferred.

Furthermore, during the treatment of the surface of the component (B) with the component (A), in order to accelerate the treatment, either heating may be used, or an effective quantity of either an acidic material such as acetic acid or phosphoric acid, or a basic material such as a trialkylamine, quaternary ammonium salt, ammonia gas, or ammonium carbonate may be used.

There are no particular restrictions on the method used for adding the component (D), although the component (D) is preferably added, and mixed into the composition containing the components (A) through (C). This mixing can be conducted using conventional methods.

[Cured Product]

In those cases where the composition of the present invention is a curable composition, there are no particular restrictions on the method used for curing the composition, and suitable methods include a method in which the composition is molded and then left to stand at room temperature, and a method in which the composition is molded and then heated at a temperature of 50 to 200° C. Furthermore, although there are no restrictions on the form of the resulting silicone cured product, the product is preferably a gel, a low hardness rubber, or a high hardness rubber. In other words, the composition of the present invention preferably cures to form either a heat conductive silicone gel or a heat conductive silicone rubber.

In this description, the term "silicone gel" refers to a cured product which has a low cross-linking density, comprises an organopolysiloxane as the primary component, and exhibits a penetration value according to JIS K2220 (¼ cone) within a range from 20 to 200. This corresponds with a product that returns a measured value (rubber hardness value) of zero for a rubber hardness measurement conducted in accordance with JIS K 6301, and is of sufficiently low hardness (that is, is sufficiently soft) as to exhibit no effective rubber hardness value.

On the other hand, the term "silicone rubber" refers to a cured product which comprises an organopolysiloxane as the primary component, exhibits a measured value (rubber hardness value) for a rubber hardness measurement conducted in accordance with JIS K 6301 that exceeds zero, and displays an effective rubber hardness value. In the present invention, a silicone rubber for which the type A durometer hardness value prescribed in JIS K 6253 falls within a range from 10 to 98 is preferred, because the resulting silicone cured product can be adhered firmly to a member as a heat radiating material, and also exhibits favorable handling properties.

EXAMPLES

As follows is a more detailed description of the present invention that presents a series of synthesis examples, examples, and comparative examples, although the present invention is in no way limited by these examples. In the following description, properties such as viscosity refer to values measured at 25° C.

Synthesis Example 1

The organopolysiloxane contained within the component (A) of the present invention was prepared in the manner described below. A 1 L four-neck flask fitted with a Graham condenser and a thermometer was charged with 350 g of an organopolysiloxane represented by a formula: $\{(CH_2=CH)(CH_3)_2SiO_{1/2}\}_3(CH_3SiO_{3/2})_1((CH_3)_2SiO)_{30}$ (vinyl group content: 0.385 mols), and the temperature was raised to 80° C. Following raising of the temperature, 0.2 g of a 1,3-divinyl-1,1,3,3-tetramethyldisiloxane complex of platinum with a platinum content of 0.5% by mass was added to the organopolysiloxane, yielding a mixture. 23.5 g (0.19 mols) of trimethoxysilane was then added dropwise to the mixture, at a rate that enabled the temperature of the reaction mixture to be maintained within a range from 80 to 90° C. Following completion of this dropwise addition, the resulting reaction mixture was left to stand at 80° C. for 6 hours to enable the mixture to age. Following this period of standing, the targeted organopolysiloxane $\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-Si(OCH_3)_3\}_{1.5}$ was obtained.

Synthesis Example 2

With the exception of replacing the organopolysiloxane represented by the formula $\{(CH_2=CH)(CH_3)_2SiO_{1/2}\}_3(CH_3SiO_{3/2})_1((CH_3)_2SiO)_{30}$ from the synthesis example 1 with a dimethylpolysiloxane represented by a formula $\{(CH_2=CH)(CH_3)_2SiO_{1/2}\}_3(CH_3SiO_{3/2})_1((CH_3)_2SiO)_{40}$, the same method as the synthesis example 1 was used to prepare a dimethylpolysiloxane represented by a formula $\{(CH_2=CH)(CH_3)_2SiO_{1/2}\}_{1.5}(CH_3SiO_{3/2})_1((CH_3)_2SiO)_{40}\{O_{1/2}(CH_3)_2Si-CH_2-CH_2-Si(OCH_3)_3\}_{1.5}$.

Comparative Synthesis Example 3

With the exception of replacing the organopolysiloxane represented by the formula $\{(CH_2=CH)(CH_3)_2SiO_{1/2}\}_3(CH_3SiO_{3/2})_1((CH_3)_2SiO)_{30}$ from the synthesis example 1 with a dimethylpolysiloxane represented by a formula $\{(CH_2=CH)(CH_3)_2SiO_{1/2}\}_2((CH_3)_2SiO)_{40}$, the same method as the synthesis example 1 was used to prepare a dimethylpolysiloxane represented by a formula $\{(CH_2=CH)(CH_3)_2SiO_{1/2}\}_1((CH_3)_2SiO)_{40}\{O_{1/2}(CH_3)_2Si-CH_2-CH_2-Si(OCH_3)_3\}_1$.

Example 1

7.87 parts by mass of a dimethylpolysiloxane with both molecular chain terminals blocked with dimethylvinylsiloxy groups and with a viscosity of 400 mPa·s (vinyl group content=0.44% by mass), 66.4 parts by mass of a true spherical alumina powder with an average particle diameter of 20 μm, 22.1 parts by mass of an amorphous alumina powder with an average particle diameter of 2.2 μm, and 1.2 parts by mass of the dimethylpolysiloxane represented by the formula $\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-Si(OCH_3)_3\}_{1.5}$ were mixed together using a mixer, thereby yielding a heat conductive silicone rubber base.

Subsequently, to this base were added 0.30 parts by mass of a copolymer of dimethylsiloxane and methylhydrogensiloxane with both molecular chain terminals blocked with trimethylsiloxy groups, with a viscosity of 5 mPa·s and containing an average of 5 silicon atom-bonded hydrogen atoms within each molecule (silicon atom-bonded hydrogen atom content=0.74% by mass) (this quantity was sufficient to provide 2.0 mols of silicon atom-bonded hydrogen atoms from this component for every 1 mol of vinyl groups contained within the dimethylpolysiloxane in the above rubber base), 0.2 parts by mass of a 1:1 mass ratio mixture of a copolymer of dimethylsiloxane and methylvinylsiloxane with both molecular chain terminals blocked with silanol groups and with a viscosity of 19 mPa·s (vinyl group content=9.6% by mass), and 3-glycidoxypropyltrimethoxysilane as an adhesion-imparting agent, and 0.05 parts by mass of 1-ethynyl-1-cyclohexanol as a curing reaction inhibitor, thereby yielding a mixture. To this mixture was added 0.05 parts by mass of a 1,3-divinyl-1,1,3,3-tetramethyldisiloxane complex of platinum with a platinum content of 0.5% by mass, thereby completing preparation of a heat conductive silicone composition.

Example 2

With the exception of replacing the 1.2 parts by mass of the dimethylpolysiloxane represented by the formula $\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-Si(OCH_3)_3\}_{1.5}$ with 1.2 parts by mass of the dimethylpolysiloxane represented by the formula $\{(CH_2=CH)(CH_3)_2SiO_{1/2}\}_{1.5}(CH_3SiO_{3/2})_1((CH_3)_2SiO)_{40}\{O_{1/2}(CH_3)_2Si-CH_2-CH_2-Si(OCH_3)_3\}_{1.5}$, a heat conductive silicone composition was prepared in the same manner as the example 1.

Comparative Example 3

With the exception of replacing the 1.2 parts by mass of the dimethylpolysiloxane represented by the formula $\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-Si(OCH_3)_3\}_{1.5}$ with 1.2 parts by mass of the dimethylpolysiloxane represented by the formula $\{(CH_2=CH)(CH_3)_2SiO_{1/2}\}_1((CH_3)_2SiO)_{40}\{O_{1/2}(CH_3)_2Si-CH_2-CH_2-Si(OCH_3)_3\}_1$, a heat conductive silicone composition was prepared in the same manner as the example 1.

Comparative Example 1

With the exception of replacing the 1.2 parts by mass of the dimethylpolysiloxane represented by the formula $\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-Si(OCH_3)_3\}_{1.5}$ with 1.2 parts by mass of a dimethylpolysiloxane represented by a formula $\{(CH_3)_3SiO_{1/2}\}_1((CH_3)_2SiO)_{30}\{O_{1/2}(CH_3)_2Si-O-Si(OCH_3)_3\}_1$, a heat conductive silicone composition was prepared in the same manner as the example 1.

Comparative Example 2

With the exception of replacing the 1.2 parts by mass of the dimethylpolysiloxane represented by the formula $\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-Si(OCH_3)_3\}_{1.5}$ with 1.2 parts by mass of a dimethylpolysiloxane represented by a formula $\{(CH_3)_3SiO_{1/2}\}_1((CH_3)_2SiO)_{30}\{O_{1/2}(CH_3)_2Si-CH_2-CH_2-Si(OCH_3)_3\}_1$, a heat conductive silicone composition was prepared in the same manner as the example 1.

[Measurements]

The properties of the heat conductive silicone compositions prepared in each of the examples and comparative examples, and the heat conductive silicone rubbers produced from those compositions, were measured using the methods described below.

[Viscosity of Heat Conductive Silicone Compositions]

The viscosity of each heat conductive silicone composition was measured in accordance with the method prescribed in JIS K 2220. The results are shown in Table 1. A small viscosity value indicates greater flowability for the heat conductive silicone composition and superior handling characteristics.

[Thermal Conductivity of Heat Conductive Silicone Compositions]

Each of the heat conductive silicone compositions was cured by heating at 120° C. for 60 minutes, and used to prepare sheets of heat conductive silicone rubber, each with a surface areas of 1 cm×1 cm and a thickness of either 1 mm or 2 mm. The thermal resistance of each of these heat conductive silicone rubbers at 50° C. was measured using a resin material thermal resistance measurement device (manufactured by Hitachi, Ltd.) in accordance with normal methods, and the thermal conductivity of the heat conductive silicone rubber was then calculated from the thermal resistance value.

[Hardness, Elongation, and Tensile Strength of Heat Conductive Silicone Compositions]

Each of the heat conductive silicone compositions was cured by heating at 120° C. for 60 minutes, yielding a heat conductive silicone rubber. The hardness of this heat conductive silicone rubber was measured using a type A durometer prescribed in JIS K 6253, and the elongation and tensile strength of the silicone rubber were measured using the methods prescribed in JIS K 6251.

[Adhesive Strength of Heat Conductive Silicone Compositions]

Each of the heat conductive silicone compositions was sandwiched between a pair of adherents (aluminum plates (JIS H 4000, A1050P), manufactured by Paltek Corporation), and then cured by heating at 120° C. for 60 minutes. The adhesion surface area was 25 mm×10 mm, and the thickness of the adhesive layer was 2 mm. The tensile shear adhesive strength of the heat conductive silicone rubber was then measured in accordance with JIS K 6850.

TABLE 1

|  | Example 1 | Example 2 | Comparative example 3 | Comparative example 1 | Comparative example 2 |
| --- | --- | --- | --- | --- | --- |
| Viscosity (Pa · s) | 60 | 70 | 70 | 60 | 60 |
| Thermal conductivity (W/m · ° C.) | 2.7 | 2.6 | 2.6 | 2.6 | 2.6 |
| Hardness | 90 | 85 | 85 | 90 | 90 |
| Elongation (%) | 30 | 50 | 40 | 5 | 5 |
| Tensile strength (MPa) | 2.5 | 2.1 | 2.3 | 0.8 | 0.8 |
| Adhesive strength (MPa) | 1.2 | 1.1 | 1.5 | 0.5 | 0.5 |

What is claimed is:

1. A heat conductive silicone composition, comprising:
   (A) an least one organopolysiloxane represented by a general formula (1):

$\{(CH_2=CH)R^1_2SiO_{1/2}\}_l(R^1SiO_{3/2})_m(R^1_2SiO)_n \{O_{1/2}SiR^1_2—R^2—SiR^1_{(3-a)}(OR^3)_a\}_o$ (1)

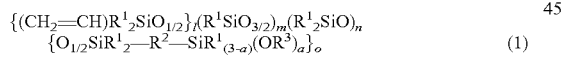

wherein,
   $R^1$ represents identical or different monovalent hydrocarbon groups,
   $R^2$ represents an oxygen atom or a bivalent hydrocarbon group,
   $R^3$ represents an alkyl group, alkoxyalkyl group, alkenyl group, or acyl group,
   L and o represent positive numbers from 1 to 10,
   m represents a number from 1 to 10,
   n represents a positive number from 5 to 100, and
   a represents an integer from 1 to 3,
   (B) at least one heat conductive filler, and
   (C) at least one organopolysiloxane other than said component (A).

2. The composition according to claim 1, wherein an average particle diameter of said component (B) is within a range from 0.1 to 100 μm.

3. The composition according to claim 1, wherein said component (B) comprises at least one alumina powder.

4. The composition according to claim 1, wherein said component (B) comprises:
   ($B_1$) at least one spherical alumina powder with an average particle diameter exceeding 5 μm but no greater than 50 μm, and
   ($B_2$) at least one spherical or amorphous alumina powder with an average particle diameter of at least 0.1 μm but no greater than 5 μm.

5. The composition according to claim 1, wherein a quantity of said component (A) is within a range from 0.1 to 10 parts by mass per 100 parts by mass of said component (B).

6. The composition according to claim 1, wherein a quantity of said component (B) is within a range from 500 to 2,500 parts by mass per 100 parts by mass of said component (C).

7. The composition according to claim 1, obtained either by mixing said component (A) into a mixture of said component (B) and said component (C), or by mixing said components (A), (B) and (C) simultaneously.

8. The composition according to claim 1, which further comprises a curing agent (D), and is curable.

9. The composition according to claim 8, wherein
   said component (C) comprises at least one organopolysiloxane containing an average of at least 0.1 silicon atom-bonded alkenyl groups within each molecule, and
   said component (D) comprises at least one organopolysiloxane containing an average of at least 2 silicon atom-bonded hydrogen atoms within each molecule, and a catalyst comprising platinum.

10. The composition according to claim 8, wherein
    said component (C) comprises at least one organopolysiloxane containing at least 2 silanol groups or silicon atom-bonded hydrolysable groups within each molecule, and
    said component (D) comprises at least one silane or siloxane oligomer containing at least 3 silicon atom-bonded hydrolysable groups within each molecule, or a combination of the silane or siloxane with a condensation reaction catalyst.

11. The heat conductive silicone composition according to claim 8, wherein
    said component (C) comprises at least one organopolysiloxane containing at least 1 silicon atom-bonded alkenyl group within each molecule, and
    said component (D) comprises at least one organic peroxide.

12. The composition according to claim 8, which on curing forms a heat conductive silicone gel or a heat conductive silicone rubber.

13. A cured product of the heat conductive silicone composition according to claim 8.

14. The composition according to claim 1, wherein $R^2$ is a bivalent hydrocarbon group.

15. The composition according to claim 9, wherein said catalyst comprises at least one selected from the group consisting of chloroplatinic acid, an alcohol solution of chloroplatinic acid, an olefin complex of platinum, an alkenylsiloxane complex of platinum, and a carbonyl complex of platinum.

16. The composition according to claim 9, wherein component (D) comprises at least one organopolysiloxane selected from the group consisting of a dimethylpolysiloxane with both molecular chain terminals blocked with dimethylhydrogensiloxy groups, a copolymer of dimethylsiloxane and methylhydrogensiloxane with both molecular chain terminals blocked with trimethylsiloxy groups, a copolymer of dimethylsiloxane and methylhydrogensiloxane with both molecular chain terminals blocked with dimethylhydrogensiloxy groups, an organopolysiloxane copolymer comprising siloxane units represented by a formula $(CH_3)_3SiO_{1/2}$, siloxane units represented by a formula $(CH_3)_2HSiO_{1/2}$, and siloxane units represented by a formula $SiO_{4/2}$, and a mixture thereof.

17. The composition according to claim 10, wherein component (D) comprises at least one silane or siloxane oligomer selected from the group consisting of tetraethoxysilane, methyltriethoxysilane, vinyltriethoxysilane, methyltris(methylethylketoxime)silane, vinyltriacetoxysilane, and ethylorthosilicate.

18. The composition according to claim 11, wherein component (D) comprises at least one organic peroxide selected from the group consisting of benzoyl peroxide, di(p-methylbenzoyl)peroxide, di(o-methylbenzoyl)peroxide, dicumyl peroxide, 2,5-dimethyl-2,5-bis-(t-butylperoxy)hexane, di-t-butyl peroxide, and t-butyl peroxybenzoate.

19. The composition according to claim 1, wherein each $R^1$ is selected from the group consisting of a methyl group, a phenyl group, and a vinyl group.

20. A heat conductive silicone composition, comprising:
(A) at least one organopolysiloxane selected from the group consisting of $\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-Si(OCH_3)_3\}_{1.5}$,
$\{(CH_2=CH)(CH_3)_2SiO_{1/2}\}_2)(CH_3SiO_{3/2})_1((CH_3)_2SiO)_{30}\{O_{1/2}(CH_3)_2Si-CH_2-CH_2-Si(OCH_3)_3\}_1$,
$\{(CH_2=CH)(CH_3)_2SiO_{1/2}\}_{1.5}(CH_3SiO_{3/2})_1((CH_3)_2SiO)_{30}\{O_{1/2}(CH_3)_2Si-CH_2-CH_2-(CH_3)Si(OCH_3)_2\}_{1.5}$, and
$\{(CH_2=CH)(CH_3)_2SiO_{1/2}\}_{1.5}(CH_3SiO_{3/2})_1((CH_3)_2SiO)_{30}\{O_{1/2}(CH_3)_2Si-O-Si(OCH_3)_3\}_{1.5}$
(B) at least one heat conductive filler, and
(C) at least one organonolysiloxane other than said component (A).

21. The composition according to claim 20, wherein an average particle diameter of said component (B) is within a range from 0.1 to 100 μm.

22. The composition according to claim 20, wherein said component (B) comprises at least one alumina powder.

23. The composition according to claim 20, wherein said component (B) comprises:
($B_1$) at least one spherical alumina powder with an average particle diameter exceeding 5 μm but no greater than 50 μm, and
($B_2$) at least one spherical or amorphous alumina powder with an average particle diameter of at least 0.1 μm but no greater than 5 μm.

24. The composition according to claim 20, wherein a quantity of said component (A) is within a range from 0.1 to 10 parts by mass per 100 parts by mass of said component (B).

25. The composition according to claim 20, wherein a quantity of said component (B) is within a range from 500 to 2,500 parts by mass per 100 parts by mass of said component (C).

26. The composition according to claim 20, obtained either by mixing said component (A) into a mixture of said component (B) and said component (C), or by mixing said components (A), (B) and (C) simultaneously.

27. The composition according to claim 20, which further comprises a curing agent (D), and is curable.

28. The composition according to claim 27, wherein
said component (C) comprises at least one organopolysiloxane containing an average of at least 0.1 silicon atom-bonded alkenyl groups within each molecule, and
said component (D) comprises at least one organopolysiloxane containing an average of at least 2 silicon atom-bonded hydrogen atoms within each molecule, and a catalyst comprising platinum.

29. The composition according to claim 27, which on curing forms a heat conductive silicone gel or a heat conductive silicone rubber.

30. A cured product of the heat conductive silicone composition according to claim 27.

31. The composition according to claim 28, wherein said catalyst comprises at least one selected from the group consisting of chloroplatinic acid, an alcohol solution of chloroplatinic acid, an olefin complex of platinum, an alkenylsiloxane complex of platinum, and a carbonyl complex of platinum.

32. The composition according to claim 28, wherein component (D) comprises at least one organopolysiloxane selected from the group consisting of a dimethyl-polysiloxane with both molecular chain terminals blocked with dimethylhydrogensiloxy groups, a copolymer of dimethylsiloxane and methylhydrogensiloxane with both molecular chain terminals blocked with trimethylsiloxy groups, a copolymer of dimethylsiloxane and methylhydrogensiloxane with both molecular chain terminals blocked with dimethylhydrogensiloxy groups, an organopolysiloxane copolymer comprising siloxane units represented by a formula $(CH_3)_3SiO_{1/2}$, siloxane units represented by a formula $(CH_3)_2HSiO_{1/2}$, and siloxane units represented by a formula $SiO_{4/2}$, and a mixture thereof.

33. The composition according to claim 1, wherein each $R^1$ is selected from the group consisting of a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, or an eicosyl group, an isopropyl group, a t-butyl group, an isobutyl group, a 2-methylundecyl group, a 1-hexylheptyl group, a cyclopentyl group, a cyclohexyl group, a cyclododecyl group, a vinyl group, an allyl group, a butenyl group, a pentenyl group, a hexenyl group, a phenyl group, a tolyl group, a xylyl group, a benzyl group, a phenethyl group, a 2-(2,4,6-trimethylphenyl)propyl group, a 3,3,3-trifluoropropyl group, and a 3-chloropropyl group.

* * * * *